United States Patent Office 3,205,912
Patented Sept. 14, 1965

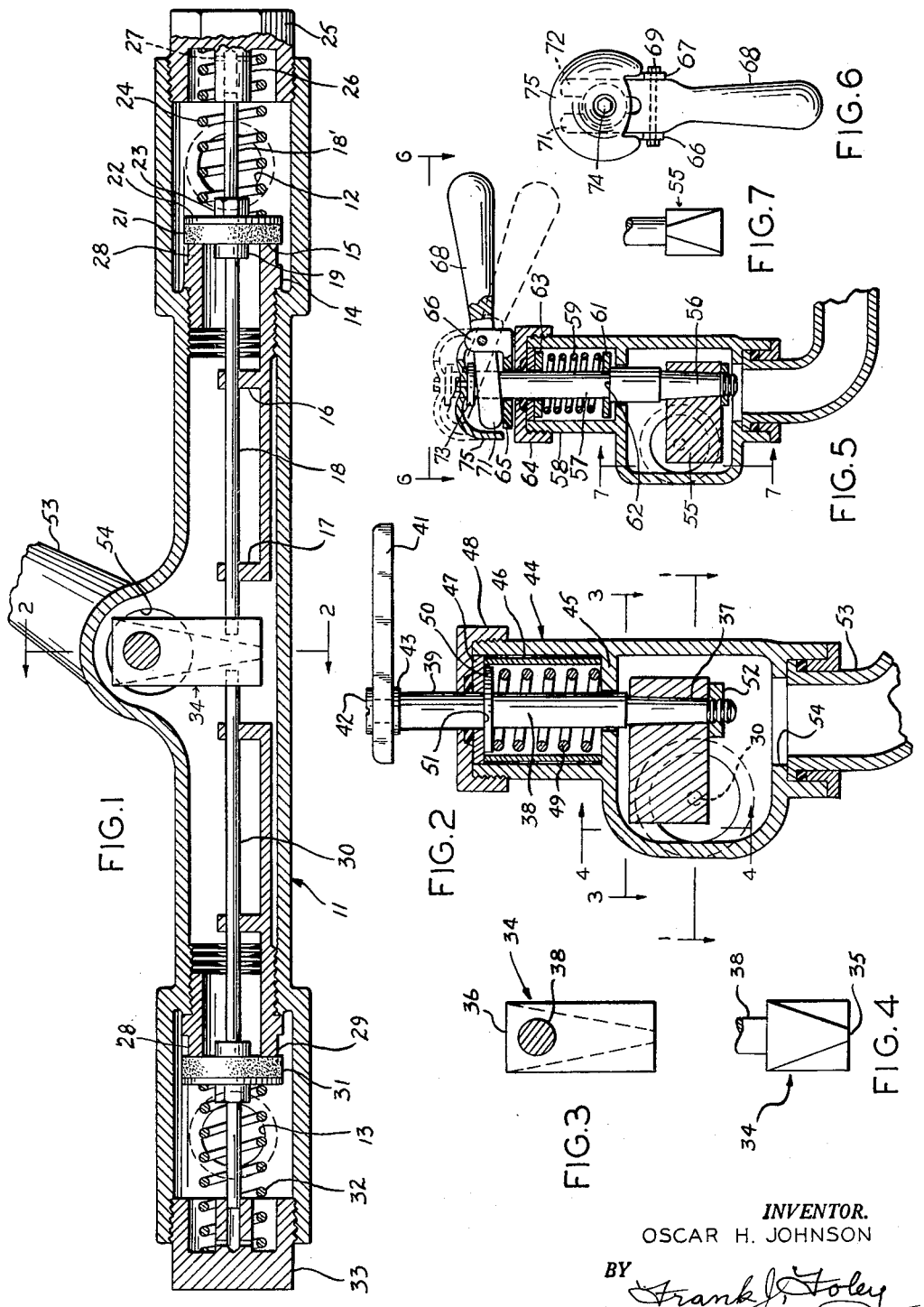

3,205,912
VALVE ASSEMBLY
Oscar H. Johnson, 7600 S. Marquette Ave.,
Chicago 49, Ill.
Filed Feb. 23, 1962, Ser. No. 175,015
4 Claims. (Cl. 137—636.1)

This invention relates to improvements in a valve assembly for controlling the supply of hot and cold water to such fixtures as lavatories, bathtubs or kitchen sinks, and is particularly well suited for use with a kitchen sink.

It is the general object of the invention to provide separate valves for controlling the hot and cold water supply, both valves being operated simultaneously or selectively by a single handle.

It is a further object of the invention to provide self-closing valves in the foregoing combination.

Another object of the invention is to provide the foregoing named features in a valve assembly which is relatively easy to assemble for installation and to disassemble for the replacement of worn parts.

Other objects and advantages of the invention will be mentioned hereinafter or will become apparent from a perusal of the following specification in which a preferred embodiment of the invention is shown and described.

In the drawing, FIGURE 1 is a longitudinal, horizontal cross section view of the entire valve assembly taken approximately on the planes of the broken line 1—1 of FIGURE 2.

FIGURE 2 is a vertical view, partly in section, taken on the line 2—2 of FIGURE 1.

FIGURE 3 is a partial sectional view taken on the plane of the broken line 3—3 of FIGURE 2.

FIGURE 4 is an end view of the valve opening wedge, taken on the plane of the line 4—4 of FIGURE 2.

FIGURE 5 is a vertical view, partly in section, corresponding in location to FIGURE 2, showing a modified valve which may be substituted for that shown in FIGURE 2.

FIGURE 6 is a top plan view of the handle and cap of the valve of FIGURE 5.

FIGURE 7 is an end view of the wedge employed in the valve of FIGURE 5.

The housing 11 has a conventional bottom inlet port 12 to which may be attached a pipe for supplying hot water. Another port 13 is provided for conventional connection with the cold water supply.

A hot water valve seat unit 14 is threaded into the housing as shown and provides the valve seat 15 and two suitably apertured brackets 16 and 17 for slidably guiding the rigid stem 18 of the hot water valve. This valve includes a shoulder 19 against which is positioned a compressible valve element 21 and the washer 22, held in a snug assembly by means of the nut 23 threaded onto the reduced outer end 18' of the valve stem. This valve is resiliently seated by the compression spring 24, whose outer end is held retained by the plug 25. The spring pilot 26 has a recess therein to slidably receive the valve stem 18' and this central recess or passage is vented by means of a small vent hole 27, as shown.

It will now be perceived that whenever the valve 21 needs to be replaced when it is worn, it is a simple matter to remove the end plug 25 and pull out the hot water valve and its stem 18–18' and then disassemble the same to put in a new element 21.

The valve seat unit, generally indicated as 14, may readily be removed by means of a tubular wrench which may embrace the outer end of this unit which may be provided with flat surfaces such as 28 in a hexagonal or octagonal design. It should be noted that the apertures in the stem supporting brackets 16 and 17 are concentric with the threading of unit 14 so that they will always maintain the valve stem properly positioned with respect to the valve operating wedge hereinafter described.

It will be observed that the entire assembly for the cold water valve mechanism is identical with the hot water valve assembly just described, the primary parts of the cold water assembly being the valve seat unit 29, valve stem 30, the compressible valve element 31, the compression spring 32 and the closing plug 33.

As is now apparent, the hot and cold water valves are normally seated by means of their associated compression springs. To operate either or both of these valves, I provide an opening or actuating wedge generally indicated as 34. The lower portion of this wedge is tapered in two planes, upwardly from the narrow, lower front edge 35 and rearwardly therefrom toward the rear broad vertical wall 36. This wedge is non-rotatably clamped on a tapered portion 37 of the handle stem or shaft 38, which has an upper, enlarged exposed portion 39 on which there is secured in any suitable manner a handle 41. If desired, this may be accomplished by a screw 42 clamping the handle against the shoulder 43, the handle itself having a square aperture to engage a conventional squared end of the handle stem 39.

A housing for this handle stem and its return spring includes the cylindrical chamber 44 extending above the partition 45, the partition serving to guide the lower end of the handle stem and above the partition is a cylindrical spacing member 46 surmounted by a washer 47, all held in place by a threaded cap 48. The compression spring 49 reacts against a washer 50 which bears against a shoulder 51 on the lower end of the enlarged stem portion 39. The compression spring normally holds the handle stem in fully raised position, thus holding the wedge 34 in raised or retracted position. A threaded nut 52 may be used to secure the wedge on the handle stem.

A curved swivelly mounted spout 53 of conventional design is secured in a conventional manner to the bottom of the central portion of the valve assembly housing 11, in registration with the outlet port 54, as shown in FIGURE 2.

The device of FIGURES 1 to 4 operates as follows:

The operator, if he desires to draw cold water only, will rotate the operator handle 41 horizontally and simultaneously rotate the wedge toward the cold water valve stem 30, thus unseating that valve. As long as he desires to continue to draw cold water, he must hold the wedge rotated in that direction.

When sufficient water has been drawn, merely by releasing the handle the cold water valve will be closed by its valve spring 32.

By a similar operation, the operator may draw hot water only.

If it be desired to draw cold and hot water simultaneously and proportion them so that a mixture of a desired temperature will flow out through the spout, the operator will push down on the handle and rotate the wedge in either direction until he obtains the desired proportion of hot and cold water. A push straight down will open both valves about the same amount. Rotation of the wedge one way or the other will reduce the opening of one valve and enlarge the opening of another. Release of the handle will, of course, enable both valves to be closed by their individual springs.

Upon release of the operating handle, the spring 49 will restore it vertically and the spring-loaded valve stems will restore the wedge to a neutral position.

It will be perceived that both valves are normally held seated by water pressure and spring pressure. Jamming of the valves and premature deterioration is eliminated.

The modified form of valve operator, shown on a reduced scale in FIGURES 5, 6 and 7 may be substituted for that of FIGURE 2.

A wedge 55 similar in general principle of use to wedge 34 inverted, is secured in any suitable manner to the lower end 56 of the valve handle stem or shaft 57, the stem extending upwardly through the cylindrical chamber 58. A compression spring 59 rests on a washer 61 seated on shoulder 62 and its upper end is held by one or more washers 63 and the threaded cap 64. A rotatable bracket plate 65 is pierced by the handle stem 57 and provides upstanding ears 66 and 67 for pivotally supporting the handle 68 on pin 69, as shown. The inner end of the handle is bifurcated to provide two fingers 71 and 72, the fingers being spaced apart by a gap, which is less in width than the diameter of the valve stem 57, and which embrace the handle stem or engage it in any suitable or conventional manner as to enable the fingers to rotate the valve stem and bear against a washer 73 which is secured to the top of the handle stem by a cap screw 74 which likewise holds in place the cover cap 75.

It will now be apparent that when the handle is in the neutral position, as shown in full lines in FIGURE 5, the hot water and cold water valves will remain closed. But when the handle is rocked downwardly, vertically straight from the neutral position both valves will be opened as the wedge 55 is raised.

Either the hot or cold water valve may be opened merely by rotating the handle 68 horizontally from its neutral position.

Both valves may be opened and in different amounts by a combined downward rocking of the handle 68 and rotation of it, thus to proportion the relative flow of hot and cold water. Adequate mixing of these two streams in the housing and nozzle readily results.

Manual release of the handle 68 enables the individual valve springs and the handle springs to restore the entire assembly to neutral, with both valves closed. Thus, wasting of water, accidentally or intentionally, is readily prevented.

While preferred forms of the invention as shown, to illustrate the nature of the invention and the manner of its use, it should be understood that some modifications and variations may be made in the invention, and are intended to be embraced within the scope of the invention defined in the appended claims.

Having shown and described my invention, I claim:

1. A valve assembly for controlling hot and cold water supplies comprising, in combination, an elongated housing open at opposite ends and having hot and cold water inlet ports near opposite ends thereof and a centrally located outlet aperture and spout, a pair of valve seat assemblies insertable longitudinally through the opposite open ends of said housing, coacting threaded means located interiorly of the housing and on the exterior of each seat assembly for positioning the seat assemblies in operative position laterally inwardly of said ports, each seat assembly having integral therewith valve stem guide means spaced inwardly from the valve seat, valve stems guided by said guide means for non-tilting rectilinear movement only and extending toward the center of the housing in alignment with each other and having their inner ends terminating at positions near but spaced apart from each other, a compressible valve element fixed on each stem for registration with a valve seat, compression springs laterally outside of said valve elements for resiliently seating them, means for closing the open ends of the housing, a manually operable shaft mounted for rotative and axial movement on an axis substantially lateral of said stem ends in a plane perpendicular to said valve stems and bisecting the space between their ends, a wedge-shaped valve stem actuator having one end fixed on said shaft and having a narrow portion remote from said axis adapted for valve stem contacting which during the at rest inoperative position of said shaft extends between said valve stem ends without displacing either of them to unseat an associated valve, the rotation of the shaft from said rest position without axial movement being adapted to cause said narrow portion to displace one or the other of said valve stems to unseat a valve, said actuator having opposite inclined wall surfaces for stem contacting remote from said axis and lateral thereof in the same direction, said surfaces mutually diverging from said narrow portion at equal angles, said surfaces being adapted upon axial movement of the shaft without rotative movement thereof to displace both valve stems equally and upon both axial and rotative movement of the shaft to selectively displace the valve stems unequally, and resilient means for automatically restoring said shaft to its at rest axial position after axial manual displacement therefrom and subsequent release, said valve seating springs and valve stems acting against the actuator in planes coincident with the stems and parallel and apart from said shaft for rotating the shaft to its rotative at rest position.

2. A valve assembly for controlling hot and cold water supplies comprising, in combination, an elongated housing open at opposite ends and having hot and cold water inlet ports near opposite ends thereof and a centrally located outlet aperture and spout, a pair of valve seat assemblies insertable longitudinally through the opposite open ends of the housing, coacting threaded means located interiorly of the housing and on the exterior of each seat assembly for positioning the seat assembly for positioning the seat assemblies in operative position laterally inwardly of said ports, each seat assembly having integral therewith valve stem guide means spaced inwardly from the valve seat, valve stems guided by said guide means for non-tilting rectilinear movement only and extending toward the center of the housing in alignment with each other and having their inner ends terminating at positions near but spaced apart from each other, a compressible valve element fixed on each stem for registration with a valve seat, compression springs laterally outside of said valve elements for resiliently seating them, means for closing the open ends of the housing, a manually operable shaft mounted for rotative and axial movement on an axis substantially lateral of said stem ends in a plane perpendicular to said valve stems and bisecting the space between their ends, a wedge-shaped valve stem actuator having one end fixed on said shaft and having a narrow portion remote from said axis adapted for valve stem contacting which during the at rest inoperative position of said shaft extends between said valve stem ends without displacing either of them to unseat an associated valve, the rotation of the shaft from said rest position without axial movement being adapted to cause said narrow portion to displace one or the other of said valve stems to unseat a valve, said actuator having opposite inclined wall surfaces for stem contacting remote from said axis and lateral thereof in the same direction, said surfaces mutually diverging from said narrow portion at equal angles, said surfaces being adapted upon axial movement of the shaft without rotative movement thereof to displace both valve stems equally and upon both axial and rotative movement of the shaft to selectively displace the valve stems unequally, and resilient means operable upon said shaft when it has been displaced axially and rotatively adapted for coacting with the valve seating springs and valve stems acting on the actuator for restoring the shaft and actuator to their at rest positions.

3. A valve assembly for controlling hot and cold water supplies comprising, in combination, an elongated housing open at opposite ends and having hot and cold water inlet ports near opposite ends thereof and a centrally located outlet aperture and spout, a pair of valve seat assemblies insertable longitudinally through the opposite open ends of the housing, coacting threaded means located interiorly of the housing and on the exterior of each seat assembly for positioning the seat assemblies in operative position laterally inwardly of said ports, each seat assembly arm having integral therewith an inwardly extending arm and valve stem guide means supported thereon spaced from the valve seat, valve stems slidably guided by said guide means for non-tilting rectilinear movement only and extending toward the center of the housing in alignment with each other and having their inner ends terminating at positions near but spaced apart from each other, a compressible valve element fixed on each stem for registration with the associated valve seat, compression springs laterally outside said valve elements for resiliently seating them, removable means for closing each open end of the housing, a manually operable shaft mounted for rotative and axial movement on an axis substantially lateral of said stem ends in a plane perpendicular to said valve stems and bisecting the space between their ends, a wedge-shaped valve stem actuator having one end fixed on said shaft and having a narrow portion remote from said axis adapted for valve stem contacting which during the at rest inoperative position of said shaft extends between said valve stem ends without displacing either of them to unseat an associated valve, the rotation of the shaft from said rest position without axial movement being adapted to cause said narrow portion to displace one or the other of said valve stems to unseat a valve, said actuator having opposite inclined wall surfaces for stem contacting remote from said axis and lateral thereof in the same direction, said surfaces mutually diverging from said narrow portion at equal angles, said surfaces being adapted upon axial movement of the shaft without rotative movement thereof to displace both valve stems equally and upon both axial and rotative movement of the shaft to selectively displace the valve stems unequally, and resilient means operable upon manual release of said shaft at a displaced axial position for restoring the shaft to its axial at rest position, the valve seating springs and the valve stems automatically reacting against the actuator upon manual release to restore the actuator by rotation to its at rest alignment transverse to the stem ends.

4. In a valve assembly, a housing having hot and cold water inlet ports at opposite ends thereof and an outlet between said ports, a valve seat associated with each port, a valve and a spring for seating the valve on each valve seat, a valve stem secured to each valve extending toward the center of the housing with its end spaced from but near the end of the opposite valve stem, means for guiding the valve stems for non-tilting rectilinear movement only, a manually operable shaft mounted for rotative and axial movement on an axis substantially lateral of said stem ends in a plane perpendicular to the valve stems and bisecting the space between the stem ends, a valve stem actuator having one end fixed on said shaft and a narrow end portion extending in a neutral plane perpendicularly from the shaft between said stem ends without displacing said stems when the shaft is at an inoperative rest position, said narrow portion being adapted for displacing one or the other of said valve stems upon rotation of the shaft without axial movement thereof from said rest position, the actuator having walls mutually diverging from said narrow portion providing therebetween an increasing transverse thickness of the actuator in a plane parallel to said shaft axis coincident with the linear axes of said stems whereby axial movement of the shaft out of said rest position without rotation thereof displaces the stem ends apart to unseat both valves equally while subsequent rotation of the shaft displaces one stem more than the other in accordance with the direction of said rotation, a handle adapted for imparting selectively axial and rotative movements to said shaft, the valve seating springs causing the stems to engage the actuator with such force and at such positions eccentric to said shaft axis as to effect rotation of the actuator back to said neutral plane upon release of the handle should the actuator then be out of said neutral plane, and spring means normally adapted for restoring the shaft axially to its at rest position.

References Cited by the Examiner

UNITED STATES PATENTS

| | | | |
|---|---|---|---|
| 975,663 | 11/10 | Watrous | 137—636.4 XR |
| 1,326,247 | 12/19 | Zengel | 137—636.1 XR |
| 1,856,458 | 5/32 | Bentley | 137—636.2 |
| 1,963,518 | 6/34 | Bradley | 137—533.29 |
| 2,031,439 | 11/42 | Moen | 137—636.1 |
| 2,616,710 | 11/52 | Woodruff | 137—636.4 XR |

WILLIAM F. O'DEA, *Primary Examiner.*